July 28, 1953  R. C. FROST  2,646,932
MODULATING GAS CONTROL
Filed Feb. 16, 1950  2 Sheets-Sheet 1

INVENTOR.
ROBERT C. FROST
BY
Tate & Weibart
ATTORNEYS

July 28, 1953 — R. C. FROST — 2,646,932
MODULATING GAS CONTROL
Filed Feb. 16, 1950 — 2 Sheets-Sheet 2

INVENTOR.
ROBERT C. FROST
BY Tate & Weikart
ATTORNEYS

Patented July 28, 1953

2,646,932

UNITED STATES PATENT OFFICE 2,646,932

MODULATING GAS CONTROL

Robert C. Frost, Milwaukee, Wis., assignor to Perfex Corporation, Milwaukee, Wis., a corporation of Wisconsin Application February 16, 1950, Serial No. 144,533

5 Claims. (Cl. 236—80)

1

This invention relates to improvements in heat regulating and other devices and has as a general object the provision of means for regulating, or modulating, the flow of fluids in proportion to the demand for such flow in accordance with variations in temperature or other conditions.

A more specific object of the invention is to modulate, for example, gas flow to a burner in a predetermined ratio to the temperature at a chosen location or locations and to modify this ratio in accordance with pressure variations and requirements of the burner.

A further object is to provide a flow control system including a main valve housing having a double-seated valve controlled by a sequentially operated valve energized by a condition responsive device the action of said double-seated valve being additionally modified by a throttling valve also condition responsive.

A still further object is to provide a novel control valve mechanism having sequential operation for controlling fluid flow through a main valve.

Figure 1:
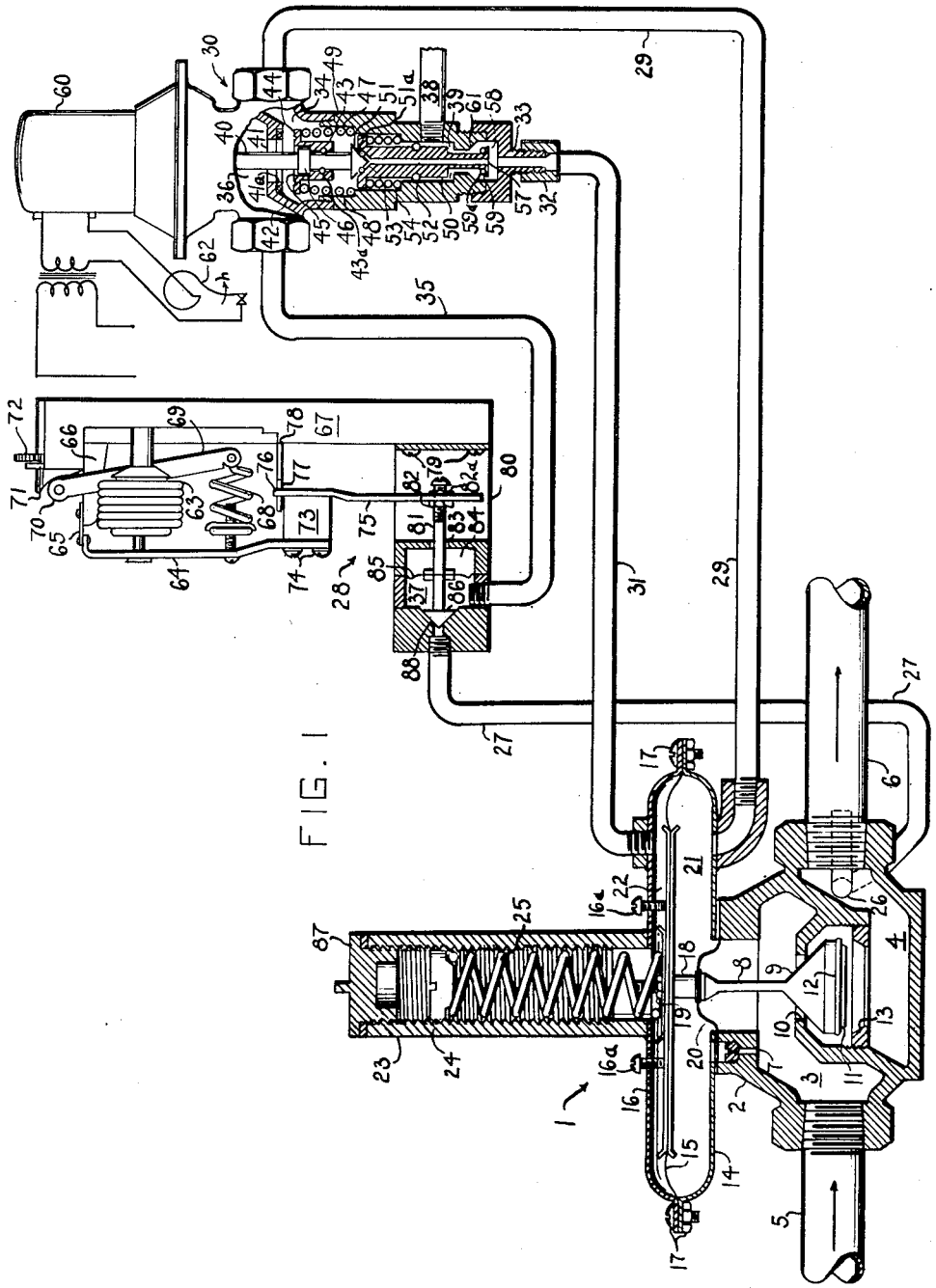
Figure 2:
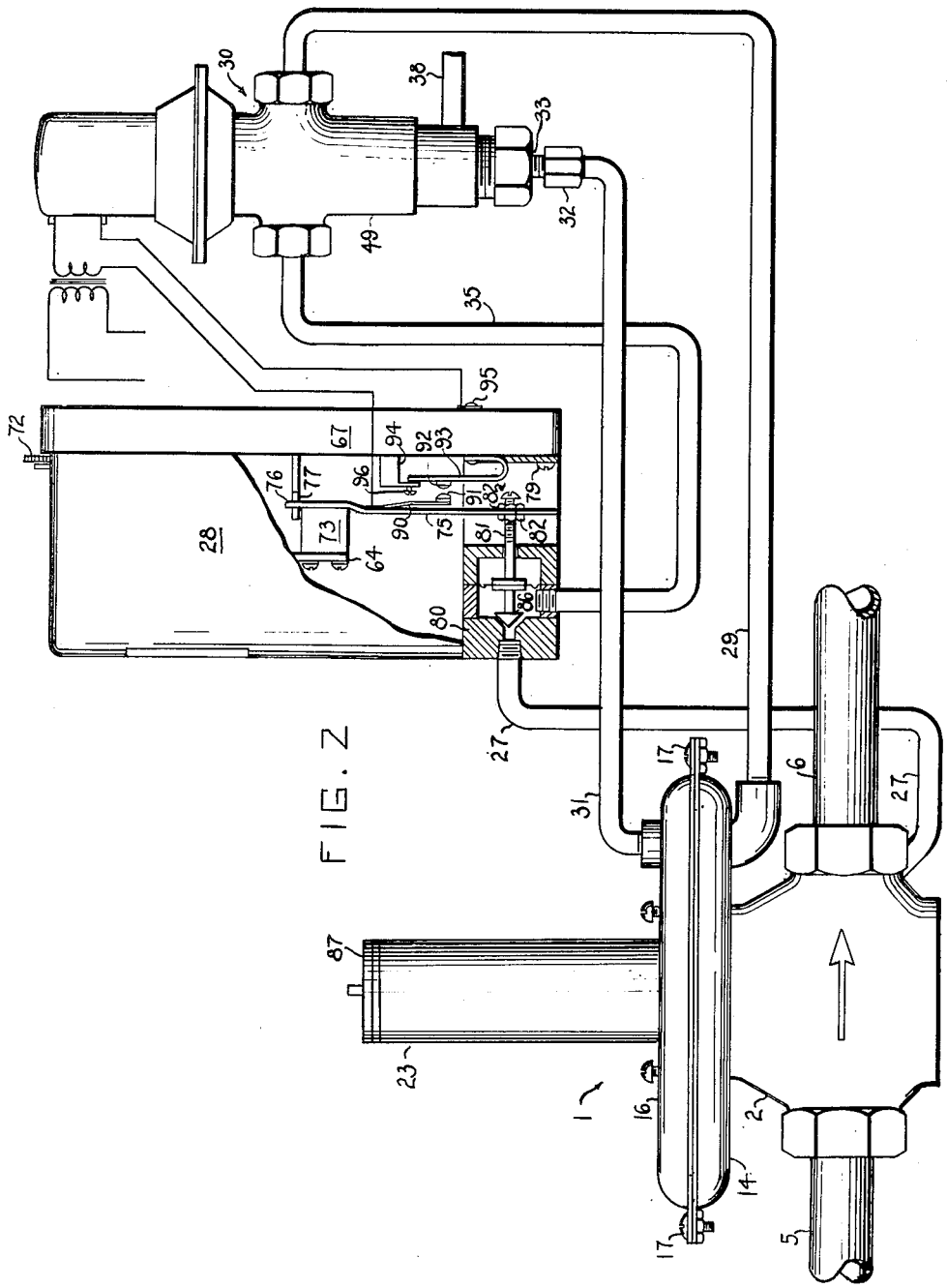

Further objects are illustrated in the following detailed description and accompanying drawings in which: Fig. 1 is a sectional view of the invention showing the valves in an operative position; Fig. 2 is a view, partially in section, of a modified form of the invention.

Referring now to Fig. 1, the main valve 1 has a housing 2 provided with an inlet chamber 3 and an outlet chamber 4. The inlet chamber 3 communicates with a fluid supply pipe 5 which supplies at least one ingredient of a combustible mixture, such as gas to a burner.

The outlet chamber 4 communicates with a fluid discharge pipe 6 leading to a burner (not shown). The housing 2 has a restricted opening 7 leading from the inlet chamber 3 to a diaphragm chamber to be later described.

Controlling the passage of fluid from inlet chamber 3 to outlet chamber 4 is a valve structure comprising a valve stem 8, a modulating valve face 9 cooperating with an upper valve seat 10, and a shut off valve face 11 having a sealing gasket 12 for cooperation with a lower valve seat 13. It is apparent that the closing of either valve seat is capable of shutting off the flow of fluid to the outlet chamber 4.

Fastened to the upper part of the housing 2 is a diaphragm assembly which is composed of a lower shell 14, flexible diaphragm 15 and upper shell 16 secured together at their peripheries by nuts and bolts 17. An extension 18 of valve stem 8 is secured to the center of diaphragm 15 by a nut 19 which provides for direct movement of valve stem 8 in accordance with pressure changes

2 affecting the diaphragm 15. A sealing diaphragm 20 separates the inlet chamber 3 from a lower diaphragm chamber 21 except for the restricted opening 7. An upper diaphragm chamber 22 is formed by the diaphragm 15 and upper shell 16. These chambers 21 and 22, under different pressures, operate the diaphragm 15 to correspondingly move the valve stem 8 to open, modulate or shut off the flow of gas through the main valve. Screws 16A threaded through the upper shell 16 provide a stop limiting the upward movement of the diaphragm 15. Fastened to the upper shell 16 by welding or other suitable means is an internally threaded tube 23. An adjusting screw 24 in the tube 23 provides a variable load adjustment to the diaphragm 15 thru the medium of a spring 25. A cap 87 and sealing gasket are threaded into the end of the tube 23.

In the outlet chamber 4 is located an aspirating tube 26 which communicates thru pipe 27 with a throttling valve 28 for a purpose to be later explained.

A tube 29 provides a connection between the lower diaphragm chamber 21 and a chamber 34 in the control valve 30. Another tube 31 connects the upper diaphragm chamber 22 with a fitting 32 threadedly attached to a nipple 33 on the control valve 30. Another tube 35 connects the upper chamber 36 of control valve 30 to a chamber 37 in throttling valve 28. A tube 38 connects a chamber 39 in control valve 30 with the atmosphere, tube 38 discharging at a point adjacent the main and pilot burners (not shown).

The control valve 30 is a sequentially operating valve operated by a heat motor or similar means controlled by a thermostat in a conventional manner. The actuator or operating means 60 here illustrated is of the heat motor type disclosed in U. S. Patent 2,322,762, issued June 29, 1943, to Homer E. Malone. This type of actuator is characterized by its relatively slow movement between energized and deenergized positions as compared to the motion of an electromagnetic operator. Extending from the heat motor and operated thereby is a valve stem 40 which is the prime mover for operating the three valves comprising the control valve 30 in sequence. The upper valve consists of a valve seat 41 formed in the casing partition 42, a sealing gasket 41A and a sleeve 43 having a flanged valve face 44 and a recess 45. A collar 46 integral with valve stem 40 engages the recess 45 to open the upper valve. The sleeve 43 is biased to closed valve position by a spring 47 contained between the flanged face 44 and a recessed shelf 48 of the casing 49. An O-ring 43a, secured to stem 40, seals the opening in the sleeve 43 through which the valve stem 40 extends. The upper valve controls the flow of fluid between the chamber 37 in the throttling valve 28 and the lower diaphragm chamber 21 in the main valve 1.

The middle valve consists of a valve head 51 integral with valve stem 40, sealing gasket 51A grooved in valve head 51, and valve face 53 formed in the piston-like member 50. The piston 50 has a centrally located longitudinal bore 57, which provides a flow passage from the chamber 34 to a lower chamber 58. Thus, the middle valve controls the flow of fluid between lower diaphragm chamber 21 and the upper diaphragm chamber 22. A spring 54 biases the piston member 50 in an upward direction against the downward force exerted by valve head 51. Therefore, movement of member 50 in a downward direction is accomplished by the valve stem 40 only after the valve head 51 has seated against the valve seat 53 closing the middle valve. An O-ring 52 is provided in a groove in the piston 50 to furnish a sealing means between the pressure chamber 34 and 39.

The lower valve consists of a flared valve face 59 integral with piston 50, a sealing gasket 59A, and valve seat 61 formed in casing 49. Note, that this lower valve opens after the middle valve closes and not before. The lower valve controls the flow of fluid between the upper diaphragm chamber 22 and the bleed 38 for a purpose to be later described. The sequence of operation of the control valve 30, when occasioned by a downward movement of stem 40, is as follows: first, the middle valve 51—53 closes; second, the lower valve 59—61 opens; and third, the upper valve 41—44 opens. The sequence of operation of the control valve 30, when occasioned by an upward movement of stem 40, is as follows: first, the upper valve 41—44 closes; second, the lower valve 59—61 closes; and third, the middle valve 51—53 opens.

The movement of valve stem 40 is obtained thru the energization of a heat motor 60 by closure of a thermostat 62, located in the enclosure to be heated.

The thermostat 62 is provided with a source of power consisting of a transformer and leads from a conventional power circuit such as the 110 volt supply of a domestic electric system.

The throttling valve 28 is a bellows actuated type of valve which utilizes a thermo-responsive fluid fill in the bellows 63 to move a lever 64 in accordance with temperature changes. The lever 64 is pivoted on a spring hinge 65, which is supported by a bracket 66 fastened to a base 67. A spring 68 is fastened at one of its ends to the lever 64 and its other end to an end of a pivoted lever 69. The other end 70 of lever 69 rides on a cam surface 71. The lever 69 is pivoted at a point intermediate of its ends (not shown). The cam surface 71 can be adjustably rotated by a manual dial 72 to vary the tension of spring 68 acting upon lever 64. This adjusting dial 72 thus varies the force opposing expansive movement of bellows 63 and therefore, the operating range. An insulation block 73 is fastened to lever 64 and also to a lever 75 by screws 74 to provide an insulated extension lever 75 of lever 64. The lever 75 has a projecting end 76, which extends thru a slotted aperture 77 in a bracket 78 fastened to the base 67. The slotted aperture 77 limits the movement of end 76 and thus limits the sweep of lever 75 in either direction.

The valve housing 80 is fastened to the base 67 by screws 79. The lever 75, extending thru an opening in housing 80, is adjustably fastened to a valve stem 81 by means of nuts 82 and 82a. The valve stem 81 extends thru a hole 83 into a chamber 84 of housing 80. A sealing diaphragm 85 is secured to the stem 81 and effectively seals the chamber 37 from the chamber 84 which is open to atmosphere. A valve head 86, integral with valve stem 81 cooperates with a valve seat 88.

The throttling valve 28 may also be located in the enclosure or room to be heated, but inasmuch as the temperature of the return air duct reflects the room temperature changes, the location is principally a matter of convenience. In this case the advantage of locating the throttling thermostat 28 in the return air duct is evident because of the proximity of the duct with the heating system, thus allowing shorter pipes 27 and 35 to be used.

In operation, assuming that the system is in a shutdown position and the heat losses from the room being heated are insufficient to lower the room temperature below the control point setting of the room thermostat 62, the various valves will be in the following positions: main valve 1: closed against valve seat 13; throttling valve 28: closed or open, depending upon the temperature of the air ambient the bellows 63; control valve 30: upper valve closed, middle valve open, and lower valve closed. Note that the main valve 1 is closed because the middle valve 51—53 of control valve 30 is open thus equalizing the pressure in diaphragm chambers 21 and 22 which allows the spring 25 and the weight of the valve parts to close the main valve 1.

Upon a sufficient increase in heat losses from the room being heated as evidenced by the closing of the contacts of room thermostat 62, the energization of the actuator 60 will result in a lowering of the valve stem 40. This movement of stem 40 will result in first, closing of the middle valve 51—53 which isolates the diaphragm chambers 21 and 22 from each other. Next, the opening of the lower valve 59—61 causes the upper diaphragm chamber 22 to bleed to atmosphere from the chamber 22, pipe 31, chamber 58, chamber 39 to pipe 38. Thus, though the pressure in the chamber 21 remains at inlet gas pressure (above atmospheric pressure), because of restricted orifice 7 connecting the inlet chamber 3 and chamber 21, the pressure in the chamber 22 drops to atmospheric pressure. Lastly, the upper valve 41—44 is opened which connects chamber 21, through the throttling valve 28, to the outlet side of the main valve 1 at the tube 26.

As soon as the lower valve 59—61 is opened by the operator 60, since chamber 21 is at inlet pressure and chamber 22 is at asmospheric pressure, the valve stem 8 in the main valve 1 will move upwardly first opening valve 11—13 and then moving valve 9—10 toward its minimum open position, as defined by the positioning of screws 16a. It will be noted that valve stem 8 always moves valve 12—13 through full-open position upon initial operation of the burner. Sufficient gas, therefore, always initially flows to the main burner to assure proper lighting. As valve 9—10 moves toward its minimum open position, the operator 60 opens the upper valve 41—44. This connects the chamber 21 to the outlet side of the main valve 1 through the pipe 29, valve 41—44, pipe 35, throttling valve 28, pipe 27, and tube 26. Wilth valve 86—88 (within throttling valve 28) in the closed position as shown in Fig. 1, this passage from chamber 21 to the outlet side of main valve 1 will be closed. Chamber 21 will, therefore, remain at inlet pressure and valve stem 8 of the main valve will carry valve 9—10 to its minimum open position, as shown in Fig. 1. After initial lighting, the main burner will, therefore, burn at minimum flame.

Assuming the throttling valve 28 is located in the return air duct from the room being heated, valve 86—88 being closed, as shown in Fig. 1, indicates that the temperature of the return air is at or above the control point setting of the throttling valve 28.

Should the heat losses from the room being heated increase, because of decreasing outdoor temperature or for some other reason, the temperature of the return air ambient to bellows 63 will decrease and valve 86—88 will slowly open. This slowly opens the passage from chamber 21 of the main valve 1 to the outlet chamber 4 of the main valve 1 previously described. As valve 86—88 opens, the pressure in chamber 21 decreases, since as the passage through valve 86—88 becomes larger in relation to the restricted orifice 7, the orifice 7 begins to have a diminishing effect on the pressure in chamber 21 and the pressure in chamber 21 approaches the outlet pressure of the main valve 1. As the pressure in chamber 21 decreases, modulating valve 9—10 is opened beyond its minimum open position. This causes increased gas flow to the main burner which is reflected in an increased heat input to the room being heated. This increased heat input serves to arrest the decrease in return air temperature and consequently the contraction of bellows 63. Eventually a position of valve 86—88, and consequently of valve 9—10, is reached where the heat input just balances the heat losses from the room. Should the heat losses from the room increase, the valve member 86, and consequently valve member 9, will move to a new position of balance to increase the flow of gas to the burner and consequently increase the heat input to the room to correspond to the new heat load.

As the heat losses from the room being heated decrease, because of, for example, increasing outdoor temperature, valve member 86, seeking a new position of balance, will move toward its seat 88 decreasing the flow of gas to the burner and consequently decreasing the heat input to the room. If, after valve 86—88 has closed and the main burner is consequently operating on minimum flame, the heat input is still greater than the heat losses, the temperature of the room will increase above the control point setting of the room thermostat 62 which will thereupon open, deenergizing the actuator 60 and closing valve 11—13 within the main valve 1 and thus completely shutting down the main burner.

It will also be noted that when the valve 86—88 is in wide open position, its effect upon the pressure in the chamber 21 of the main valve 1 will be much greater than the effect of the restricted orifice 7 since orifice 7 is very small in relation to the opening provided by valve 86—88 in wide open position. The pressure in the chamber 21 will thus be dependent upon the pressure in the outlet chamber 4 of the main valve 1. Under these conditions the main valve 1 will perform as a pressure regulator, since an increase in inlet pressure at the pipe 5 will be reflected, through passage 27, valve 86, passage 35, and passage 29, in an increase in pressure in the chamber 21. This increase in pressure will serve to move the valve 9 upwardly decreasing the pressure in the outlet chamber 4 back to the desired value. This regulating effect, is of course, diminished as the valve 86 approaches its seat 88, since the size of the passage through valve 86—88 is decreased and the restricted orifice 7 begins to have a greater effect upon the pressure in the chamber 21, and the pressure in chamber 21 approaches the pressure of inlet chamber 3 of main valve 1. If the throttling valve 28 is omitted from the system, the main valve 1 and the control valve 30 will cooperate to function as a pressure regulating valve as pointed out above. It will be noted that tube 26 is pointed downstream of the outlet chamber 4, this serves to produce an aspirating effect on the chamber 21 to minimize the variation in outlet pressure with varying rates of flow through the main valve 1, as is well known in the art.

Should the gas inlet pressure at pipe 5 fall to an extremely low value because of failure of the gas supply or for other reasons, the valve 9, as pointed out above, will be moved downwardly away from valve face 10. Upon continuing downward movement of the valve stem 8, the valve 11 will approach the valve seat 13. This restriction to gas flow will create a pressure drop across the valve face 13 which will tend to reduce further the pressure in the outlet chamber 4. This decreased outlet pressure will be reflected in a decreased pressure in the chamber 21. This decreased pressure in the chamber 21 will cause the valve 11 to move into contact with the valve face 13 completely shutting off gas flow in the main burner. Thus, if the inlet pressure should fall to a value sufficiently small to cause the valve 11 to restrict the flow of gas past the valve face 13, the valve 11 will then accelerate into closed position completely shutting off the flow of gas to the main burner. When the inlet pressure again rises to its normal value the valve 11 will not be opened, since the chamber 21 will be vented to atmosphere through pipe 29, valve 41—44, pipe 35, valve 86—88, pipe 27 and through the main burner. The valve 11—13 may again be opened by manually opening the thermostat 62 for a time sufficient to allow the actuator 60 to return the control valve 30 to its deenergized position. Upon reclosing of the thermostat, assuming the gas inlet pressure has returned to its normal value, the apparatus will function in its normal manner. This feature of the present invention has utility in that the shutting down of the system upon an abnormal decrease in inlet pressure calls attention to such decreased inlet pressure, so that the pilot burner, customarily used to ignite the main burner, may be checked to determine whether or not it is still ignited before the main valve is put back into operation. Also, the shutting off of the flow of gas to the main burner upon a momentary abnormal decrease in inlet pressure serves to keep the pressure at the pilot burner high enough to maintain it ignited, since the gas supply for the pilot burner is customarily taken off the gas supply at a point up-stream from the main valve.

Fig. 2 discloses the same system and components as Fig. 1, except that the throttling valve 28 is modified so as to additionally perform the function of the thermostat 62 of Fig. 1. This is accomplished by providing a flexible blade 90 mounted upon the lever 75 and having a multiple contact 91 supported on its free end. A U-shaped flexible member 93 is mounted on the base 67 and carries at its free end a contact 92. A suitable member 94, having an adjusting screw 96, is mounted on the base 67 and serves to limit the movement of contact 92 and member 93. The member 93 and contact 92 are connected, by means of a suitable terminal structure 95, to one side of a suitable source of electrical power. The member 90 and contact 91 are connected to the other side of the power source. It will be apparent that the contacts 91 and 92 perform the function of the contacts on the thermostat 62 of Fig. 1 without the necessity of having two thermostats. The bellows 63 constitutes the sole temperature responsive device which may be mounted in the return air duct (as in Fig. 1) or in the room or other enclosure. Thus, upon a drop in the temperature of the space to which the throttling valve 28 is exposed the contacts 91 and 92 will eventually be closed upon sufficient movement of the arm 75 to the right, as viewed in Fig. 2. As the arm 75 moves in contact-closing direction, the valve 86 will of course be moved in opening direction, however, since tube or passage 35 is closed at the valve 30, the position of valve 86 relative to its seat will have no effect on the pressure of the chamber beneath the diaphragm in the main valve and therefore will have no effect on the main valve. As soon as contacts 91—92 close, valve 30 will be moved to its actuated position permitting gas to pass through passage 35, valve 86 and passage 27. As this gas flow is established, the position of valve 86 in relation to its seat now determines the pressure existing in the chamber below the diaphragm in the main valve and consequently the position of the main valve. The pressure existing in the lower chamber of the main valve (such pressure being a function of the position of valve 86) causes the main valve to open and assume a position in relation to its seat 10 (Fig. 1) which in turn is a function of the position of valve 86. It will be evident that as valve 86 moves to the right in Fig. 2, valve face 9 of the main valve 1 will move away from its seat 10, and as valve 86 moves to the left, as viewed in Fig. 2, causing the pressure in the chamber 21 of valve 1 to rise, the valve face 9 will move toward its seat 10, cutting down the flow of gas to the main burner. The flexibility of the members 90 and 93 permit the valve 86 to have a considerable range of movement while the contacts 91 and 92 are closed. As the temperature of the space to which the throttling valve 28 is exposed increases due to a decrease in heat losses, valve 86 will be moved toward its seat, and at a predetermined point in such movement contacts 91 and 92 will be opened deenergizing the control valve 30 and consequently shutting off the flow of gas to the main burner. The point in the travel of the valve 86 at which the contacts 91 and 92 are open and closed may be adjusted by means of the adjusting screw 96.

I will be noted that this modification is similar in operation to the disclosure of Fig 1 except that because adjusting screw 96 establishes the position at which the valve 86 will be in relation to its seat when the contacts 91—92 are closed, and therefore establishes the initial position which the valve face 9 in the main valve 1 will assume upon opening of the main valve, the modification shown in Fig. 2 provides a minimum flame adjustment by means of screw 96.

What is claimed is:

1. An apparatus for passing fluid to a fluid consuming device comprising: a main valve having inlet and outlet chambers, a valve member movable to vary the fluid flow through said main valve, means including a movable wall forming a first pressure chamber above said wall and a second pressure chamber below said wall, means connecting said wall and said valve member for movement thereof, a control fluid passage connecting said first and second chambers, a restricted gas passage connecting said inlet chamber and said second chamber, a multiple control valve for said main valve operable to an energized position and an energizing device cooperating with said control valve for closing said control fluid passage, connecting said first chamber to atmosphere, and connecting said second chamber to said main valve outlet chamber upon operation of said control valve to said energized position.

2. An apparatus for passing gas to a gas consuming device comprising: a main valve having inlet and outlet chambers, a valve member movable to vary the gas flow through said main valve, means including a movable wall forming a first pressure chamber above said wall and a second pressure chamber below said wall, means connecting said wall and said valve member for movement thereof, a control gas passage connecting said first and second chambers, a restricted gas passage connecting said inlet chamber and said second chamber, a multiple control valve for said main valve operable to an energized position, and an energizing device cooperating with said control valve for closing said control fluid passage, connecting said first chamber to atmosphere, and connecting said second chamber to said main valve outlet chamber upon operation of said control valve to said energized position in response to said predetermined condition, and a throttling valve for varying the flow of gas between said second chamber and said outlet chamber when said control valve is in said energized position.

3. An apparatus for passing gas to a gas consuming device comprising: a main valve having inlet and outlet chambers, a valve member movable to vary the gas flow through said main valve, means including a movable wall forming a first pressure chamber above said wall and a second pressure chamber below said wall, means connecting said wall and said valve member for movement thereof, a control gas passage connecting said first and second chambers, a restricted gas passage connecting said inlet chamber and said second chamber, a multiple control valve for said main valve movable between an energized and deenergized position, condition responsive means operably connected to said control valve for energizing said control valve in response to a predetermined value of said condition, a multiplicity of valved ports controlled by said control valve for sequentially closing said control gas passage, connecting said first chamber to atmosphere, and connecting said second chamber to said main valve outlet chamber upon operation of said control valve to said energized position in response to said predetermined condition, and a throttling valve responsive to changes in a second condition for varying the flow of gas between said second chamber and said outlet chamber when said control valve is in said energized position.

4. An apparatus for controlling the flow of gas to a burner which heats an enclosed space, said apparatus comprising: a main valve having inlet and outlet chambers, a valve member movable to vary the gas flow through said main valve, means including a movable wall forming a first pressure chamber above said wall and a second pressure chamber below said wall, means connecting said wall and said valve member for movement thereof, a control gas passage connecting said first and second chambers, a restricted gas passage connecting said inlet chamber and said second chamber, a multiple control valve for said main valve, moveable between a deenergized position and an energized position, a thermostat closed in response to a decrease in the temperature of said enclosed space, an actuator for said control valve operable to relatively slowly move said control valve to its energized position upon closure of said thermostat, a multiplicity of valved ports controlled by said control valve for sequentially: closing said control gas passage, connecting said first chamber to atmosphere, and connecting said second chamber to said main valve outlet chamber as said control valve is moved to said energized position and a throttling valve responsive to changes in the temperature of said enclosure for varying the flow of gas between said second chamber and said outlet chamber when the control valve is in said energized position.

5. An apparatus for controlling the flow of gas to a burner which heats an enclosed space, said apparatus comprising: a main valve having inlet and outlet chambers, a modulating seat and a shut-off seat between said inlet and outlet chambers, means including a moveable wall forming a first pressure chamber on one side of said wall and a second pressure chamber on the other side of said wall, a valve member cooperable with said shut-off seat and said modulating seat, means extending into said second chamber connecting said wall and said valve member for moving said valve member away from said shut-off seat and toward said modulating seat upon an increase in pressure in said second chamber and away from said modulating seat and toward said shut-off seat upon a decrease in said pressure, a control gas passage connecting said first and second chambers, a restricted gas passage connecting said inlet chamber and said second chamber, a multiple control valve for said main valve moveable between an energized and a deenergized position, an actuator for said control valve including means operable to move said control valve to an energized position when the temperature of said enclosed space decreases below a predetermined value, a multiplicity of valved ports controlled by said control valve for sequentially: closing said control gas passage, connecting said first chamber to atmosphere, and connecting said second chamber to said main valve outlet chamber upon movement of said control valve to said energized position, and a throttling valve responsive to changes in the temperature of said enclosure for varying the flow of gas between said second chamber and said outlet chamber thereby controlling the pressure in said second chamber and the position of said valve member in relation to said modulating seat, said valve member cooperating with said shut-off seat to stop the flow of gas through said main valve upon a decrease in gas supply pressure below a critical value and maintain said flow stopped independently of a subsequent rise in gas supply pressure.

ROBERT C. FROST.

References Cited in the file of this patent

UNITED STATES PATENTS

| Number | Name | Date |
|---|---|---|
| 737,681 | Waring | Sept. 1, 1903 |
| 1,800,352 | Klees et al. | Apr. 14, 1931 |
| 2,086,037 | Kronmiller | July 6, 1937 |
| 2,163,597 | Grove | June 27, 1939 |
| 2,225,916 | Maglott | Dec. 24, 1940 |
| 2,328,279 | Jones | Aug. 31, 1943 |
| 2,476,400 | Berkholder | July 19, 1949 |